United States Patent
Davis, Jr. et al.

[15] 3,707,190
[45] Dec. 26, 1972

[54] WATERFLOODING BY REGULATING THE TOTAL HARDNESS WITHIN THE DRIVE WATER

[72] Inventors: John A. Davis, Jr., Littleton; John S. Rhudy, Denver, both of Colo.

[73] Assignee: Marathon Oil Company, Findlay, Ohio

[22] Filed: Dec. 14, 1970

[21] Appl. No.: 97,690

[52] U.S. Cl. .................................................. 166/273
[51] Int. Cl. .............................................. E21b 43/16
[58] Field of Search ............... 166/273, 274, 268, 275

[56] References Cited

UNITED STATES PATENTS

| | | | |
|---|---|---|---|
| 3,352,358 | 11/1967 | Williams | 166/273 |
| 3,470,956 | 10/1969 | Boston | 166/273 |
| 3,428,127 | 2/1969 | Atkins | 166/274 |

Primary Examiner—Robert L. Wolfe
Attorney—Joseph C. Herring, Richard C. Willson, Jr. and Jack L. Hummel

[57] ABSTRACT

Improved mobility control in waterflooding is obtained by following an aqueous solution containing a mobility reducing agent with water containing a minimum total hardness and thereafter increasing the total hardness of the drive water, preferably to a total hardness characteristic of water conveniently located to be used for the majority of the drive water. The total hardness of the water can be reduced by methods known in the art. Also, the total hardness can be increased, if necessary, by adding salts of $Ca^{++}$, $Mg^{++}$, etc. This invention is particularly useful with a miscible or miscible-like flooding agent followed by an aqueous mobility reducing agent (e.g. partially hydrolyzed, high molecular weight polyacrylamide) and this, in turn, followed by a minimum total hardness water and thereafter the total hardness of the water increased.

15 Claims, 1 Drawing Figure

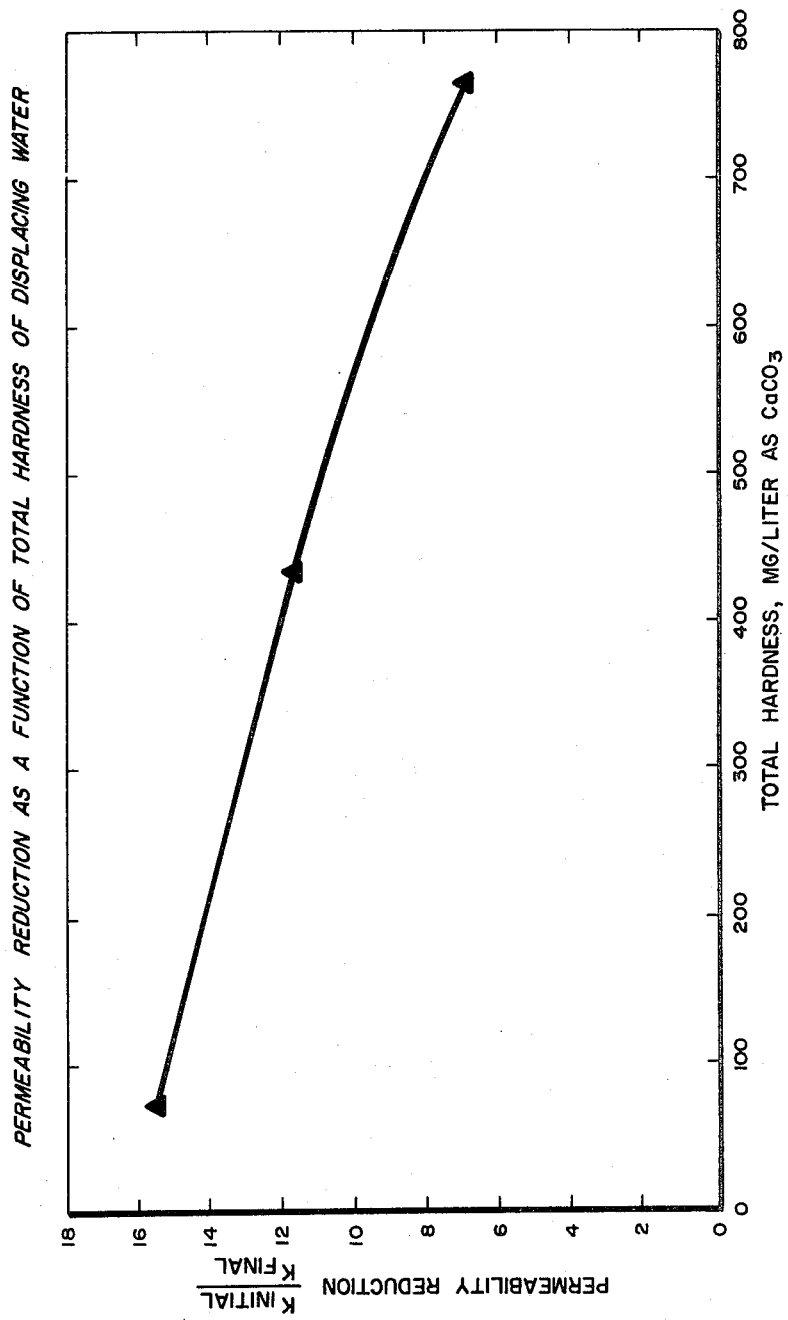

WATERFLOODING BY REGULATING THE TOTAL HARDNESS WITHIN THE DRIVE WATER

BACKGROUND OF THE INVENTION

1. Field of the Invention

This invention relates to an oil-bearing subterranean reservoir having an injection means in fluid communication with a production means and wherein a waterflood is carried out with a mobility reducing agent followed by drive water. More particularly, a miscible or miscible-like displacing agent can precede the aqueous slug containing the mobility reducing agent.

2. Description of the Prior Art

In flooding an oil-bearing subterranean reservoir, mobility reducing agents are very useful to obtain better mobility control of the waterflood and thus realize higher oil recoveries. Examples of mobility control processes are taught in U.S. Pat. Nos. 3,406,754 to Gogarty; 3,443,635 to Gogarty et al; 3,443,636 to Gogarty; 3,467,187 to Gogarty et al; 3,497,006 to Jones et al; 3,506,070 to Jones. Other patents which teach the use of particular mobility control agents in waterflooding are U.S. Pat. Nos. 2,731,414 to Binder, Jr. et al; 2,771,138 to Beeson; 2,827,964 to Sandiford; 2,843,545 to Wolf; 3,002,960 to Kolodny; 3,039,529 to McKennon; 3,067,161 to Roth; 3,282,337 to Pye; 3,370,647 to Wolgemuth, etc. In general, it is known that high molecular weight, water-soluble polymers which effectively increase the viscosity of water or reduce the permeability to the flow of water are useful to obtain mobility control. Natural polymers such as those obtained from kelp weeds are also useful as well as biopolymers.

Generally, the cost of the mobility reducing agent is instrumental in deciding whether or not to waterflood. Therefore, any reduction in the cost of the mobility reducing agent or any improvement or increase in efficiency of flooding is very important in deciding whether to waterflood a reservoir.

Applicants have discovered a novel process of reducing the concentration and/or total amount of mobility reducing agent required to flood a given oil-bearing reservoir.

SUMMARY OF THE INVENTION

By following an aqueous slug containing a mobility reducing agent with water containing a minimum total hardness and thereafter using drive water containing a higher total hardness, relative to the minimum total hardness, improved mobility control can be obtained in a waterflooding project. This invention can be used in conjunction with secondary and tertiary recovery processes wherein miscible and miscible-like slugs and other displacing agents are used before the aqueous solution containing the mobility reducing agent. The total hardness of the water can be reduced by methods known in the art, e.g. treating the water with a zeolite resin.

DESCRIPTION OF THE DRAWING

The drawing illustrates the relationship of the ratio of initial permeability to the flow of water (that is, before flooding a core with an aqueous solution containing a mobility reducing agent) divided by the final permeability (that is, the permeability to the flow of drive water in the core after the mobility reducing agent has been injected) vs. total hardness of the drive water flowing through the core. The total hardness is in milligrams per liter and represents the equivalent amount of magnesium and calcium cations within the water converted to calcium carbonate. Data for this curve is obtained by flooding a single core having an initial liquid permeability of 181 md. The mobility reducing agent is Pusher polymer 500 Series (Pusher is a trademark of Dow Chemical Company, Midland, Mich., and identifies a partially hydrolyzed, high molecular weight polyacrylamide). The core is first flooded with water A (Table I) and is then flooded with 15 pore volumes of water A (Table I) containing 500 ppm. of Pusher polymer 500 Series. Thereafter, there is injected consecutively equal volumes of waters B, C, and A, identified in Table I. This curve illustrates that better mobility control is obtained by using a minimum total hardness water immediately after the polymer slug.

DESCRIPTION OF PREFERRED EMBODIMENTS

This invention is useful with a waterflood wherein water containing a mobility reducing agent is injected into an oil-bearing subterranean formation and displaced toward a production means to recover crude oil through the production means. In addition, the aqueous solution containing the mobility reducing agent can be preceded by a displacing slug, e.g. a miscible slug, a miscible-like slug, or any slug which effectively displaces crude oil from the reservoir. Examples of displacing slugs preferred with this invention include soluble oils (both anhydrous and hydrous soluble oils), micellar dispersions (both oil-external and water-external), emulsions, microemulsions, cosurfactant slugs such as alcohol (s) and/or aldehyde(s), hydrocarbon and/or water slugs containing alcohols, surfactants, etc. As mentioned earlier, any displacing slug which can effectively displace crude oil from the reservoir can precede the aqueous slug containing the mobility reducing agent.

Examples of mobility reducing agents useful with the invention include high molecular weight natural polymers as well as synthetic polymers. Examples of these agents are taught within the patents enumerated earlier under the paragraph "Description of the Prior Art". Preferred examples of mobility reducing agents include high molecular weight polyelectrolytes, specifically high molecular weight polyacrylamides and partially hydrolyzed products thereof, sulfonated high molecular weight polymers, chemically modified natural polymers such as CMC (carboxyl methyl cellulose), and like polymers. A particularly preferred mobility reducing agent is the "Pusher" polymer sold by Dow Chemical Company, Midland, Mich. The polyelectrolytes should have an average molecular weight above about 250,000, preferably above 500,000 and more preferably about 1 to about 10 million.

The volume of aqueous mobility reducing agent injected into the reservoir can vary dependent upon the conditions of the reservoir, the viscosity of the crude oil, etc. The concentration of the mobility reducing agent within the aqueous slug also depends upon the viscosity of the crude oil, interstitial water, combination of the two, and more particularly the mobility of the formation fluids (i.e. crude oil plus interstitial water within the reservoir). Examples of preferred designs of the aqueous mobility reducing agent slug and the mobility thereof are taught within patents listed under "Description of the Prior Art".

The aqueous solution containing the mobility reducing agent is followed by water containing a minimum total hardness. Such reduces the unfavorable mobility contrast that exists between the aqueous slug containing the mobility reducing agent and the drive water. During the latter stages of drive water injection, the total hardness is increased to increase the effective permeability to the flow of the drive water. Total hardness is defined as the equivalent molecular amount of calcium and magnesium converted to calcium carbonate. Preferably, the aqueous slug containing the mobility reducing agent is followed by up to about 25 percent or more and more preferably up to 10 percent formation pore volume of the minimum total hardness water. Thereafter, the total hardness of the drive water is increased to a maximum value that preferably is characteristic of the water that is most economically available to inject into the reservoir. More preferably, the water is gradually graded from a minimum total hardness value up to a total hardness characteristic of the water readily available. From the attached FIGURE, it is readily apparent that water having an increased total hardness has an effect that increases the relative effective permeability to the flow of that water within the reservoir. Therefore, by increasing the total hardness of the water, the project life can be reduced since the effective permeability to the drive water is increased due to the total hardness as illustrated in the FIGURE, and thus the injection wells can receive a higher injection rate of water. Total hardness can be increased, when needed, by adding $Ca^{++}$ and $Mg^{++}$ salts to the water. Examples of a preferred minimum total hardness of a drive water is less than about 100 milligrams per liter and an example of a higher total hardness of a drive water is greater than about 200 milligrams per liter.

The water readily available at the waterflooding project can have its total hardness reduced by methods known in the art. A very common method is to treat the water with a zeolite resin which exchanges sodium cation for the magnesium and calcium cations. However, any ion exchange resin or method similar thereto or any method which effectively removes calcium and magnesium cations from the water is useful with this invention.

It is understood that additives can be incorporated within the drive water. Such additives include corrosion inhibiting agents, bactericides, etc.

EXAMPLE

The following example is presented to teach specific embodiments of the invention. Unless otherwise specified, all percents are based on volume:

A sandstone core taken from a reservoir in Eastern Illinois, U.S.A. is cleaned and dried. The core has an initial liquid permeability of 181 md. The core is first flooded with an aqueous solution containing 500 ppm (parts per million) of Pusher polymer 500 Series; the water is treated with a zeolite resin and has a final analyses indicated in Table I as water A. The aqueous solution containing the Pusher polymer is injected into the core. After the polymer is injected, three different drive waters are injected into the core and the effective permeability to the flow of the water in each of these cores is measured. It is noted that the permeability of the core prior to polymer injection is not sensitive to ion content in the water. Analysis of the injected waters is given in Table I.

TABLE I

WATER ANALYSES

|  |  | A | B | C |
|---|---|---|---|---|
| Carbonate | (mg/l) | 0 | 0 | 0 |
| Bicarbonate | " | 354 | 630 | 354 |
| Sulfate | " | 45 | 220 | 45 |
| Chloride | " | 174 | 6940 | 174 |
| Hardness | " | 72 | 760 | 430 |
| Calcium | " | 17 | 168 | 102 |
| Magnesium | " | 7 | 83 | 42 |
| Iron | " | 0.10 | 0.25 | 0.10 |
| Sodium | " | 228 | 4550 | 65 |
| Total Dissolved Solids | " | 807 | 12400 | 764 |

The measured permeability of the core to each of the three waters along with the permeability reduction values (i.e. initial water permeability divided by the flushed permeability or the permeability to the flow of a particular water) are given Table II.

TABLE II

PERMEABILITY OF THE CORE

| Water | Flushed Permeability (md) | Permeability Reduction |
|---|---|---|
| A | 11.8 | 15.4 |
| B | 26.1 | 7.0 |
| C | 15.4 | 11.8 |

By inspecting Tables I and II, it is readily apparent that the permeability reduction is not directly dependent upon the total dissolved salt level in the drive water. Rather, the effective permeability reduction is directly dependent upon the total hardness level of the drive water as illustrated in Table II. That is, for a drive water having a total hardness of 72, the effective permeability reduction obtained is 15.4 whereas for water C having a total hardness of 430, the effective permeability reduction is 11.8 and for water B having a total hardness of 760, the effective permeability reduction is 7.0.

Using data similar to that in Table II and specifically the attached FIGURE, improved mobility control can be designed into waterflooding projects. That is, the initial drive water following the aqueous slug containing the mobility reducing agent should contain a low total hardness to minimize the unfavorable mobility contrast that exists between the aqueous slug containing the mobility reducing agent and the drive water. During the latter stages of drive water injection, the total hardness can be increased to increase the effective permeability to the flow of the drive water and thus reduce the life of the flooding project and permit an earlier return on invested capital. Such allows for an increased injection rate which means reduced project life. Thus, this invention can be used to decrease the unfavorable mobility contrast between the aqueous slug containing the mobility reducing agent and initial drive water and thus it is possible to decrease the size of the polymer slug while maintaining the same degree of displacement efficiency.

It is not meant that the specifics taught herein limit the invention. Rather, all equivalents obvious to those skilled in the art are intended to be incorporated within the invention as defined in the specification and appended claims.

What is claimed is:

1. An improved process of waterflooding an oil-bearing subterranean reservoir having an injection means in fluid communication with a production means, the process comprising injecting into the reservoir an aqueous slug containing a mobility reducing agent and thereafter injecting drive water containing a minimum total hardness and following this drive water with drive water containing an increased total hardness, relative to the minimum total hardness, to displace crude oil toward the production means.

2. The process of claim 1 wherein a miscible slug or a miscible-like slug precedes the injection of the aqueous solution containing the mobility reducing agent.

3. The process of claim 1 wherein a micellar dispersion precedes the aqueous slug containing the mobility reducing agent.

4. The process of claim 1 wherein a soluble oil precedes the aqueous slug containing the mobility reducing agent.

5. The process of claim 1 wherein up to about 25 percent formation pore volume of the minimum total hardness drive water is injected and thereafter there is injected water containing a relatively higher total hardness.

6. The process of claim 1 wherein the mobility reducing agent is a high molecular weight polyelectrolyte.

7. An improved process of recovering crude oil from an oil-bearing subterranean formation having an injection means in fluid communication with a production means, the process comprising:

1. injecting a miscible or miscible-like displacement slug into the reservoir,
2. injecting into the reservoir an aqueous solution containing a mobility reducing agent,
3. injecting up to 25 percent formation pore volume of a drive water containing a minimum total hardness and
4. thereafter injecting drive water containing a relatively higher total hardness, as compared to the minimum total hardness, the overall effect being to impart a more efficient mobility control to the waterflooding process.

8. The process of claim 7 wherein the displacing fluid is a micellar dispersion.

9. The process of claim 7 wherein up to about 50% formation pore volume of the aqueous solution contains the mobility reducing agent is injected into the reservoir.

10. The process of claim 7 wherein the mobility reducing agent is a high molecular weight polyelectrolyte.

11. The process of claim 10 wherein the mobility reducing agent is a partially hydrolyzed, high molecular weight polyacrylamide.

12. The process of claim 7 wherein the total hardness of the drive water is gradually increased from the minimum total hardness to the relatively higher total hardness.

13. The process of claim 7 wherein the relatively higher total hardness in the drive water is obtained by adding salts of $Ca^{++}$ and/or $Mg^{++}$ to the drive water.

14. The process of claim 7 wherein the minimum total hardness of the drive water in 3. is less than about 100 milligrams per liter.

15. The process of claim 7 wherein the relatively higher total hardness of drive water in 4. is greater than about 200 milligrams per liter.

* * * * *